INVENTOR.
WILLIAM H. KITTO

Oct. 29, 1946.  W. H. KITTO  2,410,293
SUCTION CLEANER
Filed Aug. 7, 1943  2 Sheets-Sheet 2

INVENTOR.
WILLIAM H. KITTO
BY
Harry S. Demars

Patented Oct. 29, 1946

2,410,293

UNITED STATES PATENT OFFICE 2,410,293

SUCTION CLEANER

William H. Kitto, Greentown, Ohio, assignor to The Hoover Company, North Canton, Ohio Application August 7, 1943, Serial No. 497,753

8 Claims. (Cl. 183—57)

The present invention relates to suction cleaners in general and more particularly to a new and novel cleaner construction in which there is no cleaner bag or filter to be removed and cleaned by the operator. More particularly, the invention comprises an improved suction cleaner construction in which substantially all of the foreign material brought into the machine is removed by an initial dirt separator, that part of the foreign material escaping from the initial separator being filtered from the carrying air stream in a final dirt separator, there being means provided which automatically clean the final dirt separator and return the collected foreign material to the initial separator from which it can be removed without difficulty.

It is an object of the present invention to provide a new and improved suction cleaner. It is another object of the invention to provide a suction cleaner having new and improved dirt-separating means. A further object of the invention is to provide a suction cleaner in which the final dirt separator is cleaned by new and novel means. Still another object of the invention is to provide a suction cleaner in which the dirt-removing action of an initial dirt separator is supplemented by a final dirt separator which is cleaned by means of a filter-cleaning nozzle which is driven by a separate driving motor. Still another object of the invention is to provide a new and improved filter-cleaning nozzle in a suction cleaner. A still further object of the invention is to provide a suction cleaner which is capable of continuing to operate as a suction cleaner and with maximum efficiency during the period in which the final dirt separator is being cleaned. Still another object of the invention is to provide a suction cleaner in which the filter element is cleaned during the cleaning operation, the output of the suction-creating means being increased during the filter-cleaning period. These and other more specific objects will appear upon reading the following specification and claims and upon considering in connection therewith the attached drawings to which they relate.

Referring now to the drawings in which a preferred embodiment of the invention is disclosed:

Figure 1:
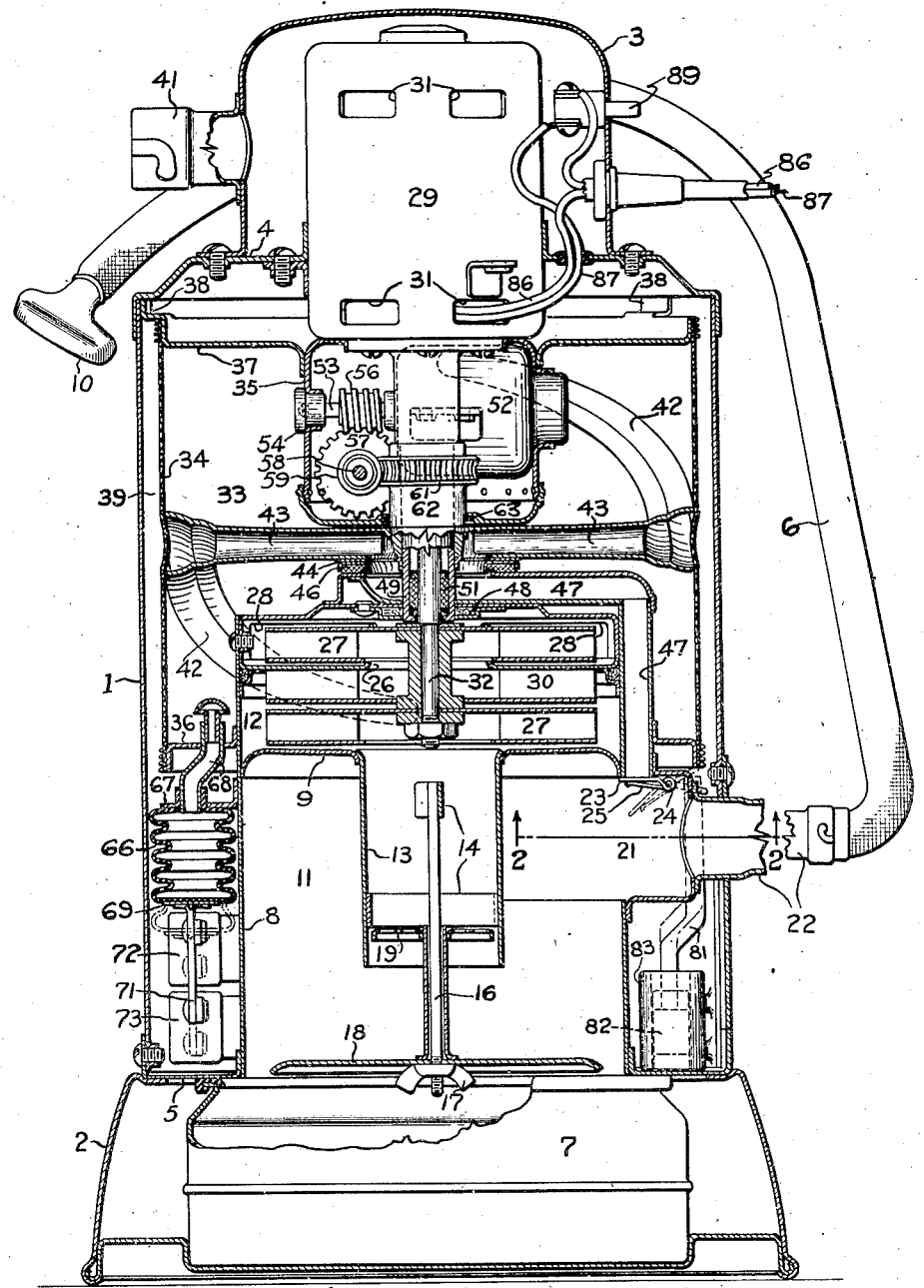
Figure 1 is a vertical section through a cleaner constructed in accordance with the present invention.
Figure 2:
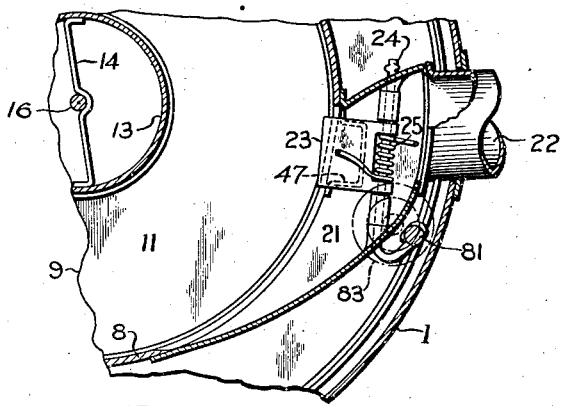
Figure 2 is a partial section through the cleaner being taken upon the line 2—2 of Figure 1.
Figure 3:
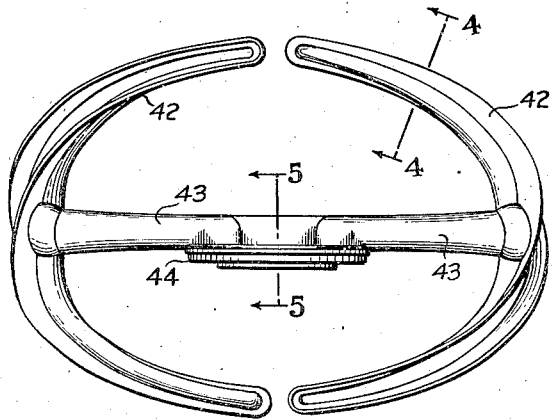
Figure 3 is a side elevation of the rotatable spiral filter-cleaning nozzle.
Figure 4:
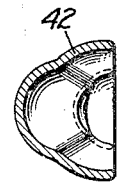
Figure 4 is a section through the nozzle upon the line 4—4 of Figure 3.
Figure 5:
Figure 5 is a section upon the line 5—5 of Figure 3.

The present invention comprises an improvement in that type of suction cleaner which embodies an initial dirt separator and a final dirt separator in combination with means to clean the final dirt separator. The patent to Bible 2,247,472 discloses the basic design of a cleaner in this field, and the present invention represents an improvement thereover in that means are provided which automatically clean the final separator without rendering the machine inoperative as a suction cleaner. In the cleaner constructed in accordance with the present invention the filter-cleaning nozzle is driven by a separate actuating force which is automatically energized, the nozzle being of a new and improved design. Additionally, the speed of rotation of the driving motor of the suction-creating means is increased during the period of operation of the filter-cleaning means so that the suction available at the main cleaning nozzle will remain substantially at its normal value in order that the cleaning ability of the machine will not be adversely affected.

Turning now to the drawings there is shown a preferred embodiment of the present invention which comprises a main housing 1, preferably cylindrical, and which seats upon a supporting base 2. The top of housing 1 is closed by a motor hood 3 which is provided with an inwardly extending collar or wall 4 adapted to support a motor. At its lower end the main housing 1 is provided with an interiorly extending rim 5 which seats and seals upon the peripheral edge or rim of the dirt container or pan 7 positioned within the base 2. The pan 7 is removable in any suitable manner from the base 2, as by being slidable horizontally therefrom, or through the top of base 2 upon the removal of the main housing from the base. This detail is incidental and not of the essence of the present invention.

A vertical cylindrical casing 8 rises from the flanged ring 5, to which it is permanently connected, and is divided by a centrally apertured transverse wall 9 into a whirl chamber 11 and a fan chamber 12. A depending inlet 13 from fan chamber 12 extends down past the mid-portion of whirl chamber 11 and vertically spaced spiders 14 in the inlet 13 carry a depending supporting rod 16 at the lower end of which is carried, by means of a manually removable nut 17, a circular plate 18 which is positioned just above the open top of the dirt pan 7 and which has a diameter somewhat smaller than the diameter of casing 8. A strainer 19 is carried by the supporting rod 16 immediately below the lower spider 14 and functions to prevent the entrance of large particles of foreign material into the fan chamber.

Whirl chamber 11 is interiorly connected through a valve chamber 21 to the inlet port 22 which extends inwardly through the outer enclosing main casing 1 being adapted at its outer end to seat a suitable dusting tool hose 6 of the usual and well known type carrying a cleaning nozzle 10 at its outer end. A horizontally extending valve 23, normally held in closed position by a spring 25, is positioned at the top of the valve chamber 21 and, through being pivotally mounted upon a shaft 24, is movable to open or close a port as will be hereinafter set forth.

A stationary deflector 30 is positioned centrally within the fan chamber 12 and divides the latter into a first stage and a second stage which are connected by the deflector port 26. A rotary centrifugal fan 27 is positioned within each stage of the fan chamber, the second stage being provided with a plurality of exhaust ports 28 to exhaust the air into the space immediately around the upper end of the cylindrical casing 8.

Within the motor hood 3 is positioned a driving motor 29, the enclosing cylindrical wall of which is provided with a plurality of apertures 31 both above and below the transverse wall 4 by which it is centrally supported. It is the shaft 32 of this motor which extends vertically down into the fan chamber 12 and there carries the spaced fans 27.

The space immediately around the upper end of the cylindrical casing 8, and also thereabove, comprises a filter chamber 33, the cylindrical side wall of which is formed by the air-permeable cylindrical filter 34 which is spaced inwardly from the enclosing main casing 1. The lower end of the filter chamber 33 is closed by the flanged collar 36 which seals to the exterior of the cylindrical casing 8 at its inner periphery while the upper end of the chamber 33 is formed by the closure plate 37. The latter is deformed to seal centrally upon a housing 35, positioned immediately below the motor casing 29 and within the chamber 33, with its outer edge held in spaced relationship to the enclosing casing 1 by means of a plurality of circumferentially spaced spiders 38, which may be formed integrally upon the plate 37.

The filter 34 of the filter chamber 33 is seen to be spaced radially within the enclosing casing 1 and the space between the filter chamber and the casing 1 is indicated by the reference character 39 and is called the discharge chamber. Air which has passed through the filter 34, having previously been exhausted by the fan unit, can escape from the discharge chamber 39 only at the upper end thereof and through the apertures between the spiders 38 of the plate 37. Above the plate 37 the apertures 31 in the motor casing 29 provide means by which the air can pass through that casing and by-pass the closure plate 4. Exit from the motor hood 3 is by means of the exhaust port 41 which, similarly to the intake port 22, is adapted to receive and seat the dusting tool hose 6. The air in passing through the motor casing 29 functions to cool the motor.

Cleaning means are provided for the dirt-collecting inner surface of the final filter 34 and comprise a pair of helical or spiral nozzles 42 each of which is seen to extend substantially 180 degrees around the inner circumference of the filter 34. Each nozzle 42 is formed with a relatively narrow mouth which is in contact with the inner surface of the filter 34, the spiral shape of the nozzles preventing the filter from a natural tendency to assume a wave forward of the nozzle in its direction of travel. The nozzles 42 are rotatably mounted upon and rigidly connected to a conduit seat 44 by means of conduit arms 43, the conduit seat being rotatably supported by means of a bearing 46 which is itself carried by the upwardly opening seat or mouth of a conduit 47. The latter is fixedly carried by and extends across the top of the fan chamber 12 then downwardly at the side of the fan chamber 21 to open into the valve chamber 21. It is this opening or port which the valve 23 is adapted to close when in the full line position illustrated in Figure 1. Suitable seals 48 are provided which seal the top of the fan chamber and the conduit 47 to a shaft-enclosing cylindrical sleeve 49 which is fixed to and extends downwardly from the underside of the motor casing 29. A bearing 51 at the lower end of the sleeve 49 provides support means for the motor shaft 32 immediately above the fans 27.

The driving means for the rotatable filter-cleaning nozzles 42 comprises a separate second motor 52 which is sealed within the housing 35 and the shaft 53 of which extends thereacross to be carried in a sealed bearing mounting 54. Shaft 53 carries a spiral worm gear 56 which meshes with a gear 57 carried by a horizontal shaft 58 extended transversely to the motor shaft 53. Shaft 58 also carries a worm 59 which meshes with a gear 61 fixedly secured to a sleeve 62 rotatably seating upon the aforedescribed bearing-supporting sleeve 49 and itself fixed to the conduit seat 44. Sleeve 62 is rotatable with gear 61 and a suitable seal 63 is provided where it extends through the lower side of the casing 35 into fixed relationship with the inlet seat 44.

The rotation of shaft 53 of motor 52 is directly transmitted through the gear train to the sleeve 62 fixedly secured to the nozzles 42 and results in their rotation at a relatively low speed. Motor 52 is a much slower speed motor than is the fan-driving motor 29 and, when its speed is further reduced through the gear train, the final result is a speed of movement of the filter-cleaning nozzles 42 appreciably lower than could be obtained were they connected directly or by a practicable speed-reducing transmission to the high-speed fan-driving motor 29.

It is desirable that the filter-cleaning nozzles 42 be actuated only when the filter 34 needs to be cleaned and this condition is always indicated by the increase in the resistance to the flow of air therethrough, which resistance is commonly known as back pressure. To determine when this back pressure is sufficiently high to warrant the cleaning of the filter there is provided an air pressure-actuated bellows 66 which is positioned below the filter chamber 33 and between the main casing 1 and the inner casing 8. Bellows 66 is carried and supported at its upper end by a bracket 67 which is itself fixedly carried by the outer wall of cylindrical casing 8. A conduit 68 extends upwardly from the bellows 66 into the filter chamber 33 and interiorly connects the bellows therewith. The lower extremity of bellows 66 carries a rigid plate 69 to which connects a vertical rod 71 which moves up and down as the bellows expands or collapses with variations in internal pressure.

Figure 6:
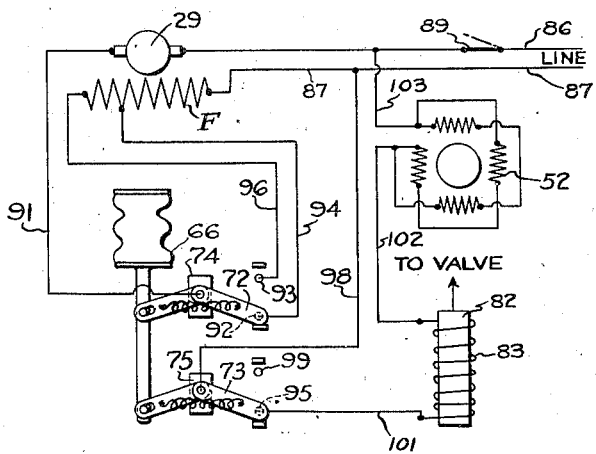
Figure 6 is a diagrammatic view of the electrical connection of the cleaner.

Vertical rod 71 is connected with a pair of snap action switches 72 and 73 and particularly to the movable contacts thereof which are shown diagrammatically in Figure 6, being pivoted at 74 and 75, respectively. The bellows 66 is normally in the contracted position, illustrated in full lines in Figure 1, but with a sufficient rise in the pressure within the filter 33 the bellows is expanded into the dotted line position shown in the same figure. This change in condition of the bellows operates switches 72 and 73 and effects a change in the electrical circuit of the main driving motor 29, and also of the filter-cleaning nozzle driving motor 52. A change is also effected in the position of the valve 23, as will be explained.

To the offset portion of shaft 24 of valve 23 is connected a plunger 81 connected to and movable with the armature 82 of an electrical solenoid 83. The energization of the solenoid causes the armature 82 to move upwardly, together with the shaft 81, thereby causing the valve 23 to move to port-opening position with respect to the port of conduit 47 and against the normal valve-closing action of the coil spring 25.

The expansion of the bellows 66 to a predetermined extent in response to the increase in air pressure within the final filter chamber 33 also effects the energization of the motor 52 and additionally effects a change in the speed of rotation of the main driving motor 29 in a manner which is best understood by reference to Figure 6 in which the electrical circuit of the machine is illustrated diagrammatically.

In Figure 6 the incoming current-conducting lines to the cleaner are indicated by the reference characters 86 and 87, the former passing through a manually controlled switch 89 on its way to the motor 29. A conductor 91 extends from the motor 29 to a movable contact of the switch 72, which contact is seen to be adapted to make contact, depending upon the position of the bellows 66, with either a lower contact 92 or an upper contact 93. A conductor 94 connects contact 92 with a mid-point of the field F of the motor 29 while a lead 96 extends from the stationary contact 93 to one end of the field, the opposite end being connected to the incoming lead 87. As the circuit through the motor including its field F is completed through the movable switch contact 72 it is clear that all or only part of the motor field will be in the motor circuit depending upon whether the movable contact 72 is in its lower position in contact with fixed contact 92, or in its upper position in contact with stationary contact 93. In the former condition the motor rotates at a much higher speed while in the latter condition, with all of the field in, the motor speed is decreased.

A conductor 98 extends from the incoming lead 87 to the pivot point of the movable contact of switch 73 which is seen to be adapted to assume a lower position where it contacts stationary contact 95 or an upper position in which it seats upon a stationary contact 99. Contact 99 has no electrical connections, and when the movable contact seats thereon no current passes through the conductor 98. With the contact of switch 73 positioned by the bellows in its lower position and therefore in contact with stationary contact 95 current is conducted from the incoming power leads 87 and 98, through the movable contact and stationary contact 95 to a lead 101 which connects directly to the winding of a solenoid 83.

The opposite side of the solenoid winding is connected through a lead 102 to the winding of the secondary motor 52 and from the opposite side thereof still another lead 103 conducts the current back to the incoming power lead 86. It is believed to be clear that with the movable contact of switch 73 seating upon the stationary contact 95, current is conducted through both the solenoid 83 and the secondary motor 52 which are then energized. The result is that the solenoid armature 82 is moved upwardly, thereby effecting the movement of the valve 23 to open position, and the motor 52 is energized, thereupon effecting, through the gear train which has been previously described, the rotation of the helical nozzles 42.

The operation of the invention is as follows. The operator closes the manually operable switch 89 when he desires to place the machine in operation. Immediately the main driving motor 29 rotates and with it the suction-creating fans 27. A suction is created within the initial dirt separator chamber 11 which is effective within the air conduit 6 and nozzle 10 to draw cleaning air therethrough and into the initial separator, together with any foreign material which may be collected by the nozzle 10 in its use by the operator. The foreign material with its carrying air enters the whirl chamber 11 and the suspended foreign material is separated by the well-known vortical whirl principle, the foreign material whirling downwardly to be deposited within the dirt pan or container 7 while the cleaned air passes upwardly through the elongated inlet 13 into the fan chamber 12 to be exhausted therefrom through the ports 28 in the final stage of the fan chamber unit.

From the fan unit the cleaned air, free from substantially all of its foreign material, enters the final filter chamber 33. The air passes outwardly through the enclosing cylindrical filter wall 34 into the discharge chamber 39, any remaining foreign material collecting upon the inner surface of the filter 34. From discharge chamber 39 the air passes upwardly and between spiders 38 of top closure plate 37, through the ports 31 in the motor 29, thereby by-passing the closure and supporting wall 4, and makes its way from the machine to the exhaust port 41. Had the operator desired initially to use the machine as a blower rather than as a dust-collecting unit, the dusting tool hose 8 would have been attached at the outlet 41.

The machine having been in use for a considerable period of time sufficient foreign material has collected upon the inner surface of the final filter 34 to result in an increase of the resistance of that filter to the flow of air therethrough. This increase in the back pressure within the final filter chamber 33 is effective within the expansible bellows 66 which is connected to the interior of the final filter chamber 33 by the conduit 68. The expansion of the bellows 66 from the full line position to the dotted line positions illustrated in Figure 1 results in the snap action movement of the movable contacts of switches 72 and 73 which move from their normal positions in contact with stationary contacts 93 and 99, respectively, to their lower positions, illustrated in Figure 6, in which they contact stationary contacts 92 and 95, respectively.

As the result of the change of position of switch 72 part of the field of the motor 29 is cut out, and that element rotates at increased speed, thereby increasing the suction-creating power of the fans.

The effect of changing the position of the movable contact of the lower switch 73 is to pass electrical current through the solenoid 83 and through the driving motor 52 of the filter-cleaning nozzle 42. The energization of the solenoid 83 results in the movement of the valve 23 to open position, illustrated in dotted lines in Figure 1, and the direct connection of the filter-cleaning nozzles 42 with the interior of the initial filter chamber 11. Air is then drawn from the discharge chamber 39 through the filter wall 34 and into the nozzles 42, from which it passes through conduits 43 and conduit seat 44 into the fixed conduit 47 on its way into the whirl chamber 11. Movement of the air through that part of the filter wall 34 contacted by the nozzles 42 is in a direction opposite to its normal direction from the interior of the filter chamber into the discharge passageway 39.

The energization of the motor 52 results in the rotation of its shaft 53 and the driving of the filter-cleaning nozzles 42 through the gear-transmission train which has been previously described and which produces the rotation of the sleeve 62 to which the nozzles 42 are secured at their seat 44. As previously described, the nozzles 42 extend helically or spirally and together extend through substantially 360 degrees of the inner periphery of the cylindrical filter 34. As they rotate around the interior of that filter at relatively slow speed the collected foreign material thereon is drawn into the nozzles and therefrom through the connected conduit 47 into the initial dirt separator 11. In the separator 11 substantially all of the foreign material which has entered from the filter-cleaning nozzles and which had previously escaped therethrough, is this time removed, the material having become agglomerated by its collection upon the final filter 34.

This automatic operation of the filter-cleaning nozzles continues until the back pressure within the filter chamber 33 decreases to such a point that the reduction in pressure upon the expansible bellows 66 permits it to contract to move the snap action switches 72 and 73 sufficiently to return their contact elements to their initial positions in which the driving motor 29 rotates at the slower speed and the solenoid 83 and the secondary motor 52 are de-energized. The machine then continues to operate with suction available only to the main cleaning nozzle 10.

Upon the collection of a large quantity of foreign material within the dirt container or pan 7, that element can be removed in a suitable manner from the enclosing base 2, it being adapted to be slid therefrom transversely or from the top of the base upon the removal of the main housing 1.

I claim:

1. In a suction cleaner of the type having a main cleaning nozzle, an initial dirt separator connected to said nozzle, suction-creating means to draw dirt-laden air through said nozzle into said initial separator and nearly clean air therefrom, a relatively high speed motor to drive said suction-creating means, and a final dirt separator of the type in which the back pressure increases with the accumulation of dirt and into which air from said suction-creating means passes; a movable separator cleaning suction nozzle to remove foreign material from said final separator, permanent means connecting said separator cleaning nozzle to a point of low pressure in said initial separator and providing an air conduit therebetween at all times, a relatively slow speed driving motor to actuate said separator cleaning nozzle, and means to energize said slow speed motor upon a predetermined increase in the resistance to the flow of air through said final separator in the operation of the cleaner and with dirt-laden air entering said initial separator.

2. In a suction cleaner of the type having an initial dirt separator, suction-creating means to draw dirt-laden air into said initial separator and air therefrom, a first motor to drive said suction-creating means, and a final dirt separator of the type in which the back pressure increases with the accumulation of dirt into which air from said suction-creating means passes; a movable suction nozzle to remove foreign material from said final separator, air-conducting means connecting said nozzle to a point of low pressure in said initial separator, valve means controlling the flow of air through said nozzle and conducting means into said initial separator, actuating means for said valve means, a second driving motor to actuate said nozzle, and means controlled by the resistance to the flow of air through said final separator to energize said valve-actuating means and said second motor upon a predetermined increase in said resistance to the flow of air.

3. In a suction cleaner of the type having an initial dirt separator, suction-creating means to draw dirt-laden air into said initial separator and air therefrom, a two speed motor to drive said suction-creating means, and a final filter into which air passes from said suction-creating means; a movable suction nozzle to remove foreign material from said final separator, air conducting means connecting said nozzle to a point of low pressure in said initial separator, valve means controlling the flow of air through said nozzle and conducting means into said initial separator, actuating means for said valve means, a second driving motor to actuate said nozzle, and means controlled by the resistance to the flow of air through said final separator to energize said valve-actuating means, said second motor and to increase the speed of said two speed motor upon a predetermined increase in said resistance to the flow of air.

4. In a suction cleaner, a dirt separator including a cylindrical filter of flexible air-permeable dirt-impermeable material, means to pass dirt-laden air through said filter in one direction, a filter-cleaning nozzle including a relatively narrow surface-contacting mouth rotatable about the longitudinal axis of said filter in contact therewith over substantially its entire length axially, said nozzle mouth extending spirally on said filter surface, means to draw air through said filter and into said nozzle in a direction opposite to said one direction, and means to actuate said nozzle.

5. In a suction cleaner, a dirt separator including a cylindrical filter of flexible air-permeable material, means to pass dirt-laden air through said filter in one direction, a filter-cleaning nozzle including a surface-contacting mouth rotatable about the longitudinal axis of said filter in contact therewith, the opposite ends of said nozzle mouth being spaced by an arc of substantially 180 degrees circumferentially on said filter surface and being spaced longitudinally by the length of said filter, means to draw air through said filter and into said nozzle in a direction opposite to said one direction, and means to actuate said nozzle.

6. In a suction cleaner, a dirt separator including a flexible cylindrical filter of air-permeable material, means to pass dirt-laden air through said filter in one direction, a plurality of filter-cleaning nozzles including surface-contacting mouths rotatable about the longitudinal axis of said filter in contact therewith, said nozzles curving around said filter so as to extend through an arc of substantially 360 degrees on said filter surface and extending the length of said filter, means to draw air through said filter and into said nozzles in a direction opposite to said one direction, and means to actuate said nozzles.

7. In a suction cleaner, a main cleaning nozzle, an initial dirt separator connected to said nozzle, suction-creating means to draw dirt-laden air into said initial separator and nearly clean air therefrom, a final dirt separator, of the type in which the resistance to the flow of air therethrough increases with the accumulation of dirt, connected to said suction-creating means to receive said nearly clean air therefrom, a separator-cleaning nozzle movable relative to said final dirt separator, permanent air-conditioning means connecting said separator-cleaning nozzle to said initial dirt separator, means controlling the flow of air through said separator-cleaning nozzle to said initial dirt separator during cleaner operation and with dirt-laden air entering said initial separator, and means to effect an increase in the air-moving power of said suction-creating means during the time air flows through said separator-cleaning nozzle.

8. In a suction cleaner, a main cleaning nozzle, an initial dirt separator connected to said nozzle, suction-creating means to draw dirt-laden air into said initial separator and nearly clean air therefrom, a two speed motor connected to said suction-creating means, a final dirt separator, of the type in which the resistance to the flow of air therethrough increases with the accumulation of dirt, connected to said suction-creating means to receive said nearly clean air therefrom, a separator-cleaning nozzle movable relative to said final dirt separator, permanent air-conducting means connecting said nozzle to said initial dirt separator, normally closed valve means controlling the flow of air in said air-conducting means during the operation of the cleaner in the cleaning operation, and means to open said valve means and to change said motor to high speed operation upon the resistance of air through said final dirt separator reaching a predetermined maximum to increase the capacity of said suction-creating means to move air simultaneously through said main cleaning nozzle and through said separator-cleaning nozzle.

WILLIAM H. KITTO.